United States Patent Office 2,985,533
Patented May 23, 1961

2,985,533

BACITRACIN PRODUCT AND PROCESSES UTILIZING MANGANESE COMPOUNDS

Ralph Allan Zorn, Muscatine, Iowa, assignor to Grain Processing Corporation, Muscatine, Iowa, a corporation of Iowa No Drawing. Filed June 13, 1958, Ser. No. 741,725

10 Claims. (Cl. 99—2)

This invention relates to a bacitracin product and the process for preparing the same.

It is well known that bacitracin may be prepared by the cultivation of microorganisms and particularly *Bacillus subtilis*. This antibiotic has recently found considerable application in preparation of feeds for poultry and livestock. Thus when bacitracin is incorporated into feeds, a marked stimulation of the growth of the poultry or livestock is observed.

One difficulty with bacitracin is, however, that it is unstable under ordinary conditions of storage. Also, in the production of bacitracin by fermentation methods a considerable amount of the bacitracin may be lost during the normal process of recovery, which process usually involves the steps of evaporating and drum drying the fermentation mash.

Accordingly, it is an object of this invention to provide a bacitracin composition which has a high degree of stability upon storage.

A further object of this invention is the provision of an animal feed supplement containing bacitracin which has been stabilized against deterioration upon storage even under the conditions of high humidity.

A still further object of this invention is the provision of a process for recovering bacitracin in a manner which permits a high percentage of recovery with small losses as compared to prior art recovery procedures.

Further and additional objects will appear from the following description and the accompanying claims.

In accordance with one embodiment of this invention it has been found that an improved bacitracin-containing product may be prepared by adding thereto a small amount of a water-soluble compound of manganese. The manganese serves to stabilize the bacitracin against deterioration in storage. The invention is particularly useful in the preparation of animal feed supplements which contain a nutrient base and bacitracin. In this instance the bacitracin has also been treated with a water-soluble manganese salt in order to stabilize the bacitracin in the feed product.

This invention has particular utility in the treatment of fermentation mashes for the recovery of bacitracin. Thus, in accordance with this invention, the fermentation mash containing the bacitracin is treated with a small amount of a water-soluble manganese salt prior to the time that the fermentation mash is evaporated and drum dried. It has been discovered that by the incorporation of manganese salt in this manner only a comparatively small amount of bacitracin is lost in the subsequent concentrating and drying procedures.

For a more complete understanding of this invention, reference will now be made to a specific example. It will be understood, of course, that the invention is not to be limited to the specific example given, since it will be apparent that many modifications may be made without departing from the spirit and scope of the invention.

An aqueous fermentation medium was prepared containing 7.5 percent soybean flour, 2.0 percent cornstarch, 1.0 percent calcium carbonate, and 0.33 percent magnesium sulfate. This medium was sterilized by conventional techniques and was then inoculated with one-half volume percent of a 24-hour liquid culture of *Bacillus subtilis*. The inoculated medium was then incubated at about 30° C. under constant aeration conditions for a period of 30 hours. At the end of the fermentation period the pH was about 8.1.

After the fermentation had been completed, 1.0 percent by weight of manganese sulfate was added to the liquid fermentation mash and thereafter the fermentation product is suitable for sale to feed manufacturers as such or it may be standardized to a predetermined bacitracin potency utilizing corn meal, soybean meal, or other nutrient diluent. Thus, one suitable feed supplement is one in which about equal parts of drum-dried material and corn meal are blended to produce a product containing 10 grams of bacitracin per pound of feed supplement.

A characteristic of the drum-dried material and of the feed supplement is that the bacitracin contained therein is very stable under storage conditions. This is particularly important where the bacitracin is employed in feeds that may be stored for some time before being consumed.

It has been determined that the manganese provides the storage stability for the bacitracin. At the present time it is not known in what manner the manganese acts to stabilize the bacitracin. For example, it is not known whether the manganese forms a salt or a complex with the bacitracin materials. It can only be stated at the present time that the manganese serves as a stabilizing agent.

In the foregoing example manganous sulfate has been referred to as the specific compound which was the vehicle for incorporating manganese into the bacitracin. However, it will be apparent that any of the nontoxic, water-soluble salts of manganese may be included, such as manganous chloride, manganous nitrate, manganous bromide and the like. Generally speaking, the amount of manganese sulfate employed should be between about .01 percent and 5.0 percent of the weight of the fermentation mash treated with it. Preferably, however, this range is between 0.3 percent and 2.0 percent. Expressed in terms of bacitracin potency, the concentration of manganese employed should be between about 0.6 percent and 300 percent of the weight of bacitracin.

In the foregoing example one particular fermentation medium is referred to. However, it will be apparent to one skilled in the art that there may be variations in this regard and that any fermentation medium known to be suitable for producing bacitracin by *Bacillus subtilis* may be included. The important ingredients are, of course, water, metabolizable carbohydrate and a nitrogen source such as assimilable protein.

While a particular embodiment of this invention has been described in the foregoing, it will of course be apparent that the invention is not to be limited thereto, but rather is to be restricted only by the scope of the appended claims.

I claim:

1. In a process for recovering bacitracin, the steps of adding a water-soluble manganese salt to a bacitracin-containing aqueous fermentation mash and thereafter removing water from said mash by evaporation.

2. A fermentation mash containing bacitracin having added thereto in the presence of water a small amount of a water-soluble salt of manganese in an amount sufficient to stabilize the bacitracin in the mash.

3. A fermentation mash containing bacitracin having added thereto in the presence of water a water-soluble salt of manganese, the concentration of manganese in the composition being between about 0.6 and about 300 percent of the weight of the bacitracin present.

4. A fermentation mash containing bacitracin having added thereto in the presence of water a water-soluble manganous salt, the concentration of manganese in the composition being between about 0.6 and 300 percent of the weight of the bacitracin present.

5. An animal feed supplement comprising a fermentation residue containing bacitracin having added thereto in the presence of water a small amount of a water-soluble salt of manganese sufficient to stabilize the bacitracin.

6. An animal feed supplement comprising a fermentation residue containing bacitracin having added thereto in the presence of water a water-soluble salt of manganese, the concentration of the manganese in said supplement being between about 0.6 and about 300 percent of the weight of the bacitracin therein.

7. An animal feed supplement comprising a fermentation residue containing bacitracin having added thereto in the presence of water a water-soluble manganous salt, the concentration of the manganese in said supplement being between about 0.6 and about 300 percent of the weight of the bacitracin therein.

8. In a process for recovering bacitracin, the steps of adding a water-soluble manganese salt to a bacitracin containing aqueous fermentation mash and thereafter removing at least a portion of the water from said mash.

9. In a process for recovering bacitracin, the steps of adding a water-soluble manganese salt to a bacitracin-containing aqueous fermentation mash, the amount of said salt being between about 0.01 and about 5.0 percent of the weight of said mash, and thereafter removing at least a portion of the water from the treated mash by evaporation.

10. The process of claim 9 wherein said salt is a manganous salt.

References Cited in the file of this patent

UNITED STATES PATENTS 2,203,584    Hodge _____ Aug. 20, 1957

FOREIGN PATENTS 513,316    Canada _____ May 31, 1955